United States Patent

Kahng

[15] 3,700,932

[45] Oct. 24, 1972

[54] CHARGE COUPLED DEVICES

[72] Inventor: Dawon Kahng, Bridgewater Township, Somerset County, N.J.

[73] Assignee: Bell Telephone Laboratories, Incorporated, Murray Hill, Berkeley Heights, N.J.

[22] Filed: June 18, 1970

[21] Appl. No.: 47,205

[52] U.S. Cl. ............307/304, 340/173.2, 307/221 C, 317/235 R

[51] Int. Cl. ..........................G11c 19/00, G11c 13/00

[58] Field of Search ...340/173.2; 307/303, 304, 279, 307/221 C; 317/235 R

[56] References Cited

UNITED STATES PATENTS 3,142,045 7/1964 Bobeck...................340/173.2

OTHER PUBLICATIONS

U.S. Reports; Electronics, " Silicon Technology Simplifies Devices" 3/30/70, pages 45- 48; 317- 235

*Primary Examiner*—Stanley M. Urynowicz, Jr.
*Attorney*—R. J. Guenther and Arthur J. Torsiglieri

[57] ABSTRACT

The specification describes a charge coupled device for information storage and processing in the form of discrete charge bundles. The device is characterized in that the storage medium is a semi-insulating material such as ZnO or ZnS. The carriers representing the information can normally be introduced and retrieved through ohmic contacts.

8 Claims, 2 Drawing Figures

Figure 1:
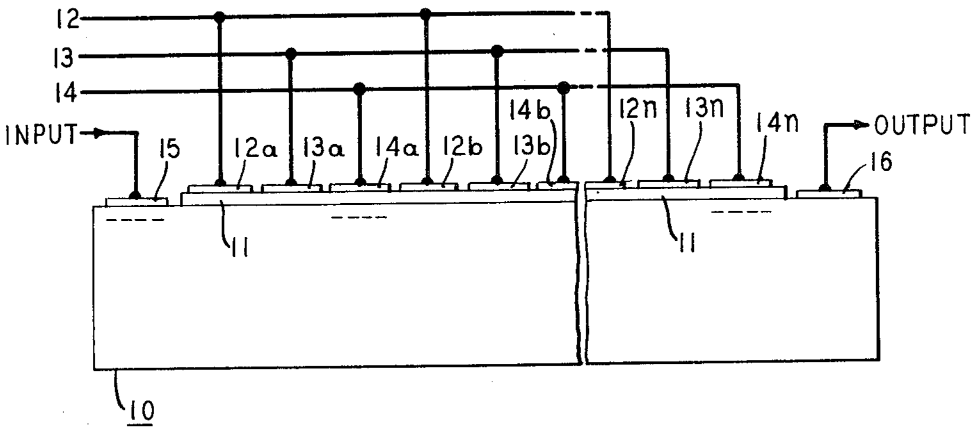

INVENTOR
D. KAHNG
BY
ATTORNEY

CHARGE COUPLED DEVICES

This invention relates to information storage devices and in particular to the new class of devices in which electric charge, representing information, if stored, translated and detected within a semiconductor medium. These devices are now identified as "charge coupled devices."

This class of devices was first described and claimed in United States patent application, Ser. No. 11,541 which was filed on Feb. 16, 1970 now abandoned by W. S. Boyle and G. E. Smith. The essential functional mechanism for these devices requires the formation of charges within a semiconductor with a localized field in the semiconductor confining these charges in discrete bundles. Movement of the field within he semiconductor results in movement of the associated charge bundle. The charge can be detected by appropriate means at the new location. Thus the information represented by the charge can be stored, processed and retrieved.

The devices described in the application referred to above are essentially minority carrier devices, that is, the charge carriers that represent the information are minority carriers in the semiconductor. This suggests that the semiconductor has properties favorable to minority carrier generation and that the input and detection stages relate specifically to that type, i.e., ones capable of transferring minority carrier. It also suggests that the functional behavior of the device relies on the presence of depleted regions within the semiconductor. This aspect was brought out in connection with previous charge coupled devices in which the depleted regions were charge storage sites.

It has now been found that the essential functions of these former devices can be carried out in a different kind of storage medium in which the active regions or storage sites are inherently depleted of carriers. This new storage medium can be one of several known insulating or semi-insulating semiconductors. These materials have been of interest for some time, usually in connection with piezoelectric and photoelectric effects. Exemplary of some semi-insulating materials useful for this invention are the II-VI compounds, especially ZnO, CdS, ZnS, ZnSe, and CdSe. These materials are ionic semiconductors with large bandgaps and generally low charge carrier density. Other materials having these properties are $KTaO_3$ and $BaTiO_3$. These materials normally occur as n-type semiconductors although this property is not important for the purpose of the invention. In he n-type material the charges injected, translated and detected would advantageously be electrons. Where pertinent, this description will assume that configuration although the invention is not so limited.

There are several advantages of the new device. The field required to store and translate the charge representing the information can be comparatively small. The tolerances on the spacing between storage sites are in some cases less severe than in known minority carrier charge coupled devices.

Since certain of these materials have large bandgaps, thermal generation of carriers or "noise" can be characteristically low. This permits longer carrier lifetime and consequently longer storage times. In a preferred embodiment of the invention, the material has a bandgap exceeding 1.5 volts but less than 8 volts.

The invention also allows a new freedom in the selection of materials in terms of their surface or interface properties. With the present state of the art, the surface state density is characteristic of the materials forming the interface. A reduction in the number of surface states (recombination sites) made possible through the use of new combinations of materials will result in longer carrier lifetime and more efficient transfer. A further advantage, and one which has structural implications with respect to certain device embodiments, is that the carriers representing the information can be injected directly into the device through an ohmic contact. The detection stage can also comprise an ohmic contact.

These and other aspects of the invention will be evident from the following detailed description. In the drawings:

FIG. 1 is a front elevation of a device made in accordance with the teachings of this invention; and FIG, 2 is a front elevation of a portion of a preferred form of the device of FIG. 1.

An exemplary device functioning via the principles of this invention is shown in FIG. 1. The device is essentially a shift register. In this context a shift register is considered to be a fundamental element from which a wide variety of logic, delay, imaging and other devices can be constructed.

A distinctive feature of this device is the material 10 which constitutes the storage medium. This material is insulating or semi-insulating. This means that during operation the material is completely depleted or free carriers that could combine with charge being translated between storage sites.

Specific materials that can conveniently be prepared with this property and that are considered advantageous are ZnO, ZnS, CdS and $KTaO_3$. The insulating layer 11 is a high quality, thin, dielectric material having properties suitable for the intermediate layer of an MIS device. $SiO_2$ and $Al_2O_3$ are given as exemplary materials. The metal field plates **12*a*, 12*b*, 12*n*, 13*a*, 13*b*, 13*n*, 14*a*, 14*b*, and 14*n* are connected to a three wire drive system including conductors 12, 13 and 14. Sequentially biasing these conductors will sequentially bias the field plates and create an apparent traveling field along the surface of the semi-insulating body 10. Carriers injected through the input stage 15 will be carried by this field to output stage 16** where the presence or absence of charge is detected. For a more through description of this charge translating mechanism, see United States patent application, Ser. No. 11,541, filed Feb. 16, 1970, by W. S. Boyle and G. E. Smith. To the extent that disclosure supplements this, it is intended as incorporated herein by reference.

The material 10 can be defined more specifically in terms of the structure of the device as follows:

$$\epsilon E/e > nt \qquad (1)$$

where $\epsilon$ is the dielectric constant of the insulating layer 11, $E$ is the electric field across that layer, $e$ is the electron charge ($1.6 \times 10^{-19}$), $t$ is the thickness of medium 10, and $n$ is the free carrier concentration of the medium 10.

The product $\epsilon E$ defines the polarization P of the insulator 11. The observed polarization for an insulator of exceptional quality is $10 \times 10^{-6}$ coulombs $cm^{-2}$. Thus a practical maximum for the quantity P/$e$ is of the order of $6 \times 10^{13}$, so that Equation (1) can be reduced to:

$$nt < 6 \cdot 10^{13}. (2)$$

While these expressions serve to distinguish the materials of this invention from the more conventional semiconductors recommended for the prior art device, it may be helpful to further differentiate these materials from highly insulating materials in which the mobility is so low that hole or electron conduction is not practical. For this purpose the material should have a mobility of at least $10^{-4}$cm$^2$/volt sec. While typical materials useful for the invention have bandgaps of the order of a few volts, there is no theoretical maximum since the storage medium itself does not have to supply carriers. It is however necessary to have a barrier difference, e.g., at least one volt, between storage medium and the adjacent insulator. Thus for example, if the storage medium is a high bandgap material such as $SiO_2$, the insulator should have a higher bandgap (e.g., BeO).

It should be emphasized that the input and output stages, or either of them, can comprise ohmic contacts for direct injection and/or collection of carriers. However, in some cases it may be advantageous to include a rectifying barrier at either site, e.g., as part of a pulse-forming or pulse-detection network. In such cases it would not be unexpected to use, for example, a Schottky barrier contact at 15 or 16.

Drive field schemes other than he three wire arrangement of FIG. 1 are readily adaptable to the invention. For example, the two-wire technique described and claimed in United States application Ser. No. 11,448 which was filed on Feb. 16, 1970 now U.S. Pat. No. 3,651,349 by D. Kahng and E. H. Nicollian is especially suitable.

Figure 2:
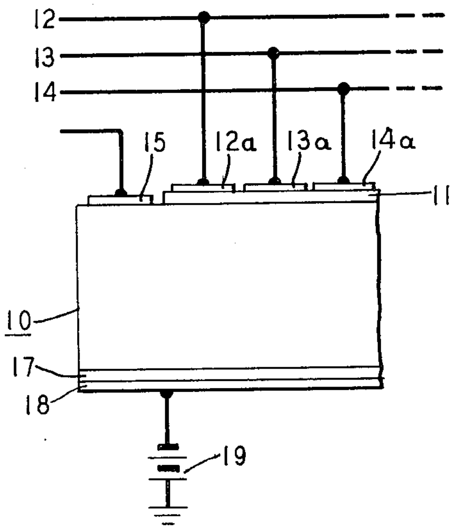

A preferred structure for the invention includes, in addition to those elements shown in FIG. 1, an MIS layer on the obverse side of the semi-insulating body 10. This added structure allows a field to be impressed on the body 10 without injecting carriers. This serves to restrict the charge being transferred to the active surface region of the device thereby increasing the charge transfer efficiency. This expedient is also helpful when the layer 10 is very thin as, for example, in the case where the layer 10 is a deposited thin film. The structure just described is shown in FIG. 2 as a portion of the device of FIG. 1, additionally including an insulating layer 17 and a metal layer 18. The bias means 19 is made negative with respect to the injecting contact 15 in the case where the material 10 is n-type. The layer 17 can be conveniently formed in the same operation as that used to form layer 11.

Finally, it is important to recognize that the use of the insulating semiconductor storage medium according to this invention is more than the simple substitution of another semiconductor material in the known charge coupled device. The use of the insulating material changes the basic character of the device. It was believed that the minority carrier storage mechanism using surface depletion of semiconductors was an important ingredient of the former device. The present discovery that a similar storage function can be performed in insulating media is significant and gives certain advantages as pointed out earlier.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A charge coupled memory device comprising:

a charge storage medium, an insulating layer covering the charge storage medium, a plurality of several discrete charge storage sites within the charge storage medium, each formed by an associated electrode field plate disposed on the insulating layer, said electrode field plates being spaced along the insulating layer with each contiguous to at least two other field plates such that with appropriate electrical bias applied to at least two of said electrode field plates electrical charge can be made to pass controllably between selected charge storage sites and ultimately to a detection site, means for introducing mobile electrical charge into the charge storage sites, means for transferring within the medium the electrical charge between storage sites and to the detection site, and means for detecting the electrical charge at the detection site, the invention characterized in that the charge storage medium is an insulating or semi-insulating material.

2. The device of claim 1, in which the semi-insulating material has a bandgap in the range of 1.5 volts to 8.0 volts.

3. The device of claim 1, in which the semi-insulating material is selected from the group consisting of ZnO, ZnS, CdS, CdSe, ZnSe, CdSe, $BaTiO_3$, and $KTaO_3$.

4. The device of claim 1, further including an MIS structure covering the surface opposite said first surface.

5. The device of claim 1, in which the transfer means comprises an insulating layer and a plurality of conductive field plates on the insulating layer.

6. The device of claim 5, in which the insulating or semi-insulating material meets the following criterion:

$$\epsilon E/e > nt$$

where $\epsilon$ is the dielectric constant of the insulating layer, $E$ is the electric field across the insulating layer, $e$ is the electron charge, $t$ is the thickness of the semi-insulating material, and $n$ is the concentrations of carriers in the material.

7. The device of claim 6, in which $nt < 6 \cdot 10^{13}$.

8. A charge coupled device comprising a charge storage medium, a charge input region at a first location in he charge storage medium at which mobile charge carriers representing signal information can be introduced into the medium, a charge detection region at a second location in the charge storage medium at which charge carriers can be detected and charge storage and transfer means interconnecting the input region and the detection region, the charge storage and transfer means comprising a homogeneous insulating or semi-insulating charge storage and transfer layer, an insulating layer overlying said charge storage and transfer layer, at least four discrete electrodes disposed on the insulating layer and means for sequentially biasing the electrodes to transfer within the medium the charge carriers from the input region to the detection region.

* * * * *